(12) United States Patent
Danielsson et al.

(10) Patent No.: US 12,131,518 B2
(45) Date of Patent: Oct. 29, 2024

(54) DEVICE AND A METHOD FOR ASSOCIATING OBJECT DETECTIONS BETWEEN FRAMES USING A NEURAL NETWORK

(71) Applicant: Axis AB, Lund (SE)

(72) Inventors: Niclas Danielsson, Lund (SE); Haochen Liu, Lund (SE)

(73) Assignee: AXIS AB, Lund (SE)

( * ) Notice: Subject to any disclaimer, the term of this patent is extended or adjusted under 35 U.S.C. 154(b) by 342 days.

(21) Appl. No.: 17/539,261

(22) Filed: Dec. 1, 2021

(65) Prior Publication Data
US 2022/0198778 A1 Jun. 23, 2022

(30) Foreign Application Priority Data
Dec. 21, 2020 (EP) .................................. 20216134

(51) Int. Cl.
*G06V 10/74* (2022.01)
*G06N 3/04* (2023.01)
(Continued)

(52) U.S. Cl.
CPC ............ *G06V 10/761* (2022.01); *G06N 3/04* (2013.01); *G06V 10/44* (2022.01); *G06V 10/762* (2022.01); *G06V 10/82* (2022.01)

(58) Field of Classification Search
CPC ............ G06T 7/90; G06T 2207/10024; G06T 2207/20084; G06T 7/11;
(Continued)

(56) References Cited

U.S. PATENT DOCUMENTS 10,025,950 B1 * 7/2018 Avasarala ......... G06F 18/23213
11,144,761 B2 * 10/2021 Gaidon ................. G06F 18/214
(Continued)

FOREIGN PATENT DOCUMENTS

CN 104200495 A 12/2014
CN 106778712 A 5/2017
(Continued)

OTHER PUBLICATIONS

R. Zhang, J. Guo, H. Jiang, P. Xie and C. Wang, "Multi-Task Learning for Location Prediction with Deep Multi-Model Ensembles," 2019 IEEE 21st International Conference on High Performance Computing and Communications; IEEE 17th International Conference on Smart City; IEEE 5th International (Year: 2019).*
(Continued)

*Primary Examiner* — Andrae S Allison
(74) *Attorney, Agent, or Firm* — Volpe Koenig (57) ABSTRACT

A method and a device associate an object detection in a first frame with an object detection in a second frame using a convolutional neural (CNN) network trained to determine feature vectors such that object detections relating to separate objects are arranged in separate clusters. The CNN determines a reference set of feature vectors associated with the object detection in the first frame, and candidate sets of feature vectors associated with a respective one of identified areas corresponding to object detections in the second frame. A set of closest feature vectors is determined, and then measure of closeness to the reference set of feature vectors is determined for each candidate. A respective weight is determined for each object detection in the second frame. The object detection in the first frame is associated with one of the object detections in the second frame based on the assigned weights.

15 Claims, 4 Drawing Sheets

(51) Int. Cl.
*G06V 10/44* (2022.01)
*G06V 10/762* (2022.01)
*G06V 10/82* (2022.01)

(58) Field of Classification Search
CPC ........... G06T 2207/20081; G06F 18/22; G06F 18/24; G06F 16/5838; G06F 18/213; G06F 18/241; G06N 3/02; G06N 3/045; G06V 10/56; G06V 20/20
See application file for complete search history.

(56) References Cited

U.S. PATENT DOCUMENTS

| | | | |
|---|---|---|---|
| 11,580,785 B1* | 2/2023 | Kundu | G06T 7/246 |
| 2017/0161919 A1* | 6/2017 | Schroeder | G06V 30/19173 |
| 2017/0286774 A1* | 10/2017 | Gaidon | G06T 7/248 |
| 2019/0005657 A1 | 1/2019 | Gao et al. | |
| 2019/0130191 A1 | 5/2019 | Zhou et al. | |
| 2019/0236371 A1* | 8/2019 | Boonmee | G06V 10/764 |
| 2020/0110966 A1* | 4/2020 | Revaud | G06V 10/454 |
| 2020/0126241 A1* | 4/2020 | Wang | G06N 3/048 |
| 2020/0226415 A1 | 7/2020 | Mathew et al. | |
| 2022/0335291 A1* | 10/2022 | Sawada | G06N 3/08 |

FOREIGN PATENT DOCUMENTS

| | | | |
|---|---|---|---|
| CN | 109671103 A | 4/2019 | |
| CN | 110363791 A | 10/2019 | |
| EP | 3229206 A1 | 10/2017 | |
| EP | 3518145 A1 | 7/2019 | |
| WO | 2019/237516 A1 | 12/2019 | |

OTHER PUBLICATIONS

Communication pursuant to Article 94(3) EPC for European Patent Application No. 20216134.5.
Extended European Search Report dated Jun. 18, 2021 for European Patent Application No. 20216134.5.
Wojke et al., "Simple Online and Realtime Tracking with a Deep Association Metric," (2017).
Rezatofighi et al., "Joint Probabilistic Data Association Revisited," 2015 IEEE International Conference on Computer Vision (ICCV), 2015, pp. 3047-3055 (2015).
Yoon et al., "Online Multiple Pedestrians Tracking using Deep Temporal Appearance Matching Association," (2020).
Chen et al., "Blazingly Fast Video Object Segmentation with Pixel-Wise Metric Learning," (2018).
Kong et al., "Recurrent Pixel Embedding for Instance Grouping," in 2018 IEEE/CVF Conference on Computer Vision and Pattern Recognition (CVPR), Salt Lake City, UT, USA, pp. 9018-9028 (2018).
De Brabandere et al., "Semantic Instance Segmentation with a Discriminative Loss Function," (2017).
Fathi et al., "Semantic Instance Segmentation via Deep Metric Learning," (2017).
He et al., "Mask R-CNN" (2018).

* cited by examiner

DEVICE AND A METHOD FOR ASSOCIATING OBJECT DETECTIONS BETWEEN FRAMES USING A NEURAL NETWORK

FIELD OF INVENTION

The present invention relates to tracking objects in a video, and specifically to associating an object detection in a first frame with an object detection in a second frame using a convolutional neural network.

TECHNICAL BACKGROUND

When tracking of multiple objects in a video, a Kalman filter or similar method may be used. In such methods, tracks of multiple objects are sequentially updated from frame to frame based on object detections in the frames. In order to update the tracks, object detections in a current frame are first associated with the existing tracks in the previous frame. When the associations have been performed, the tracks of the previous frame are updated based on the location of the associated object detections in the current frame.

The associations may be made based on probabilities that say how likely it is that an existing track in the previous frame and an object detection in the current frame are the same object. These probabilities may be based on Kalman filter state variables. For example, the Kalman filter state variables may be used to predict the location, speed etc. of a tracked object in the current frame. The predicted location, speed etc. of a tracked object may then be compared to the location, speed etc. of the detected objects in the current frame to see how likely it is that the tracked object and each of the detected objects are the same object.

In such an approach, the association sometimes fails and tracks are lost. As a result, there may be an identity switch in the tracks, such that a track first follows one object and then, by mistake, continues to follow another object.

SUMMARY

Facilitating enhanced association of an object detection in a first frame with an object detection in a second frame in order to reduce the risk of erroneous association would be beneficial.

According to a first aspect, a method for associating an object detection in a first frame with an object detection in a second frame using a convolutional neural network is provided. The convolutional neural network has been trained to determine feature vectors such that feature vectors of object detections relating to separate objects are arranged in separate clusters in a feature vector space. In the method, an area of the first frame is received corresponding to the object detection in the first frame, and a set of feature vectors associated with the area in the first frame comprising two or more feature vectors is determining by the trained convolutional neural network, thereby determining a reference set of feature vectors comprising two or more feature vectors. A plurality of areas of the second frame are further received corresponding to respective ones of a plurality of object detections in the second frame. For each of the plurality of areas in the second frame, a set of feature vectors associated with that area in the second frame are determined by the trained convolutional neural network, thereby determining a plurality of candidate sets of feature vectors. For each feature vector of the reference set of feature vectors, a predetermined number of feature vectors having smallest distances in the feature vector space to that feature vector of the reference set of feature vectors are identified among the feature vectors of the plurality of candidate sets of feature vectors, thereby identifying a set of closest feature vectors. For each candidate set of feature vectors of the plurality of candidate sets of feature vectors, a measure of closeness to the reference set of feature vectors is determined as a proportion of the set of closest feature vectors that belong to that candidate set of feature vectors. For each of the plurality of object detections in the second frame, a weight based on the determined measure of closeness to the reference set of feature vectors of the candidate set of feature vectors corresponding to that object detection is assigned. The object detection in the first frame is associated with one object detection of the plurality of object detections in the second frame based on the assigned weights.

As used herein, the same object refers to the same instance of an object, i.e., the same physical object.

By object detections relating to separate objects is meant object detections that do not relate to the same instance of an object, i.e., that relate to different physical objects. For example, it could be object detections relating to different instances of the same object type. In situations where there are objects of several different object types, it could also be object detections relating to objects of different types.

By feature vectors of object detections relating to separate objects are arranged in separate clusters in a feature vector space is meant that internal distances in the feature vector space between feature vectors of the same object are typically smaller than distances in the feature vector space between feature vectors of different objects. However, outliers may occur, i.e., feature vectors of an object may have a substantially larger distance in the vector space to the other feature vectors of the object than the internal distances between the other feature vectors of the object. In such a case, that feature vector may have a smaller distance to one or more feature vectors of other objects than the distance to the other feature vectors of the object to which it relates.

By determining the measure of closeness for each candidate set and then assigning a respective weight to each object detection based on the determined measure of closeness of the candidate set corresponding to the respective object detection according to the method of the first aspect, an effective way of setting weights indicating a similarity between each object detection in the second frame to the object detection in the first frame is achieved. Such weights may for example be used to add the property similarity of appearance of objects in relation to associating an object detection in a first frame with one of a plurality of object detections in a second frame, and thus enhance algorithms where such association is made on another basis, such as based on a predicted state of an object in the second frame. Furthermore, since the weights are based on measures of closeness which, in turn, take into account all feature vectors for the object detection in the first frame, spatial variation of the feature vectors for the object detection in the first frame is taken into account in the assigned weights.

By selecting a higher predetermined number of feature vectors having smallest distances in the feature vector space, the influence on the measure of closeness of a few outliers of the candidate sets will be reduced such that the measure of closeness will to larger extent depend on the feature vectors of each candidate set that are located closer to a centre of that candidate set in the feature vector space. On the other hand, the predetermined number of feature vector having smallest distances in the feature vector space should not become too high such that it becomes close of the total number of feature vectors of all candidate sets.

The assigned weights may be such that for any two object detections of the plurality of object detections in the second frame having the same measure of closeness, the assigned weights are the same for the two object detections, and for any object detection of the plurality of object detections in the second frame having a higher measure of closeness than another object detection of the plurality of object detections in the second frame, the assigned weight is higher for said any object detection than the assigned weight for said another object detection. By this, the weights will influence the association when the measures of closeness differ and will not influence the association when the measures of closeness are the same. This is advantageous, for example, when the weights are used to adapt algorithms where association is made on another basis, such as based on a predicted state of an object in the second frame. The weights can then be applied such that they will add the property similarity of appearance of objects in the association, such that when the weights indicate than an object detection in the second frame has a higher measure of closeness, the association is made more probable to that object. On the other hand, when the weights of two different objects are the same, the weight will not influence the association and the association would be based only on the other basis, such as on the predicted state.

The assigned weights may be such that, for each of the plurality of object detections in the second frame, the assigned weight is proportional to the determined measure of closeness to the reference set of feature vectors of the candidate set of feature vectors corresponding to that object detection. This is advantageous, for example, when the weights are used to adapt algorithms where association is made on another basis, such as based on a predicted state of an object in the second frame. The weights can then be applied such that they will add the property similarity of appearance of objects in the association, such that the weights will influence the association proportionally to their size.

The assigned weights may be such that, for each of the plurality object detections in the second frame, the assigned weight is one plus a difference between the measure of closeness of that object detection and the average measure of closeness of the object detections of the plurality of object detections in the second frame other that object detection.

For each object detection of the plurality of object detections in the second frame, an association score indicating a probability that that object detection in the second frame is associated with the object detection in the first frame may be calculated based on the weight for that object detection.

The association score may further be based on a predicted state in the second frame of the object detection in the first frame.

The predicted state may comprise one or more of a predicted size, predicted shape, predicted location, predicted speed, and predicted acceleration.

The object detection in the first frame may be associated with an object detection of the plurality of object detections in the second frame having the highest association score.

The object detection in first frame may be associated to a track, and the track may be updated based on the object detection in second frame with which the object detection in the first frame is associated. By basing the association of the object detection in the first frame with one object detection of the plurality of object detections in the second frame on the assigned weights, the property similarity of the appearance of objects is added, and thus algorithms where such association is made on another basis, such as based on a predicted state of an object in the second frame, may be enhanced. Thus, updating the track based on such an association will reduce the risk of erroneously updating the track based on an erroneous object detection in the second frame and hence risk that the track is lost or that the track starts following another object.

Determining, by the trained convolutional neural network, a set of feature vectors associated with the area in the first frame may comprise determining, by the trained convolutional neural network, a first plurality of feature vectors for a plurality of sub-areas of the first image frame, and identifying a set of feature vectors of the first plurality of feature vectors associated with the area in the first frame comprising two or more feature vectors, thereby determining a reference set of feature vectors comprising two or more feature vectors. Determining, for each of the plurality of areas in the second frame, by the trained convolutional neural network, a set of feature vectors associated with that area in the second frame may comprise determining, by the trained convolutional neural network, a second plurality of feature vectors for a plurality of sub-areas of the second image frame, and, for each of the plurality of areas in the second frame, identifying a set of feature vectors associated with that area in the second frame, thereby determining a plurality of candidate sets of feature vectors.

According to a second aspect, a non-transitory computer-readable storage medium is provided having stored thereon instructions for implementing the method according to the first aspect, when executed by a device having processing capabilities.

The above-mentioned features of the method according to the first aspect, when applicable, apply to this second aspect as well. In order to avoid undue repetition, reference is made to the above.

According to a third aspect, a device for associating an object detection in a first frame with an object detection in a second frame is provided using a convolutional neural network trained to determine feature vectors such that feature vectors of object detections relating to separate objects are arranged in separate clusters in a feature vector space.

The device comprises circuitry configured to perform the method according to the first aspect.

The above-mentioned features of the method according to the first aspect, when applicable, apply to this third aspect as well. In order to avoid undue repetition, reference is made to the above.

A further scope of applicability of the present concepts will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that is the concepts set forth herein are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising," "including," "containing," and similar wordings does not exclude other elements or steps.

BRIEF DESCRIPTION OF THE DRAWINGS

The above and other aspects will now be described in more detail, with reference to appended figures. The figures should not be considered limiting but are instead used for explaining and understanding.

DETAILED DESCRIPTION

The present concepts will now be described hereinafter with reference to the accompanying drawings, in which currently preferred embodiments are illustrated. These concepts may, however, be embodied in many different forms and should not be construed as limited to the embodiments set forth herein.

The concepts are applicable in scenarios in which an object detection in a first frame is to be associated with an object detection in a second frame. Such a scenario is for example when tracking an object in a sequence of frames. In such tracking, a track associated with an object identification in a first frame in the sequence of frames should be updated in relation to a second subsequent frame comprising a plurality of object detections. In such a scenario, it is important that the object detection in the first frame is associated with a correct one object detection of the plurality object detections in the second frame.

Figure 1:
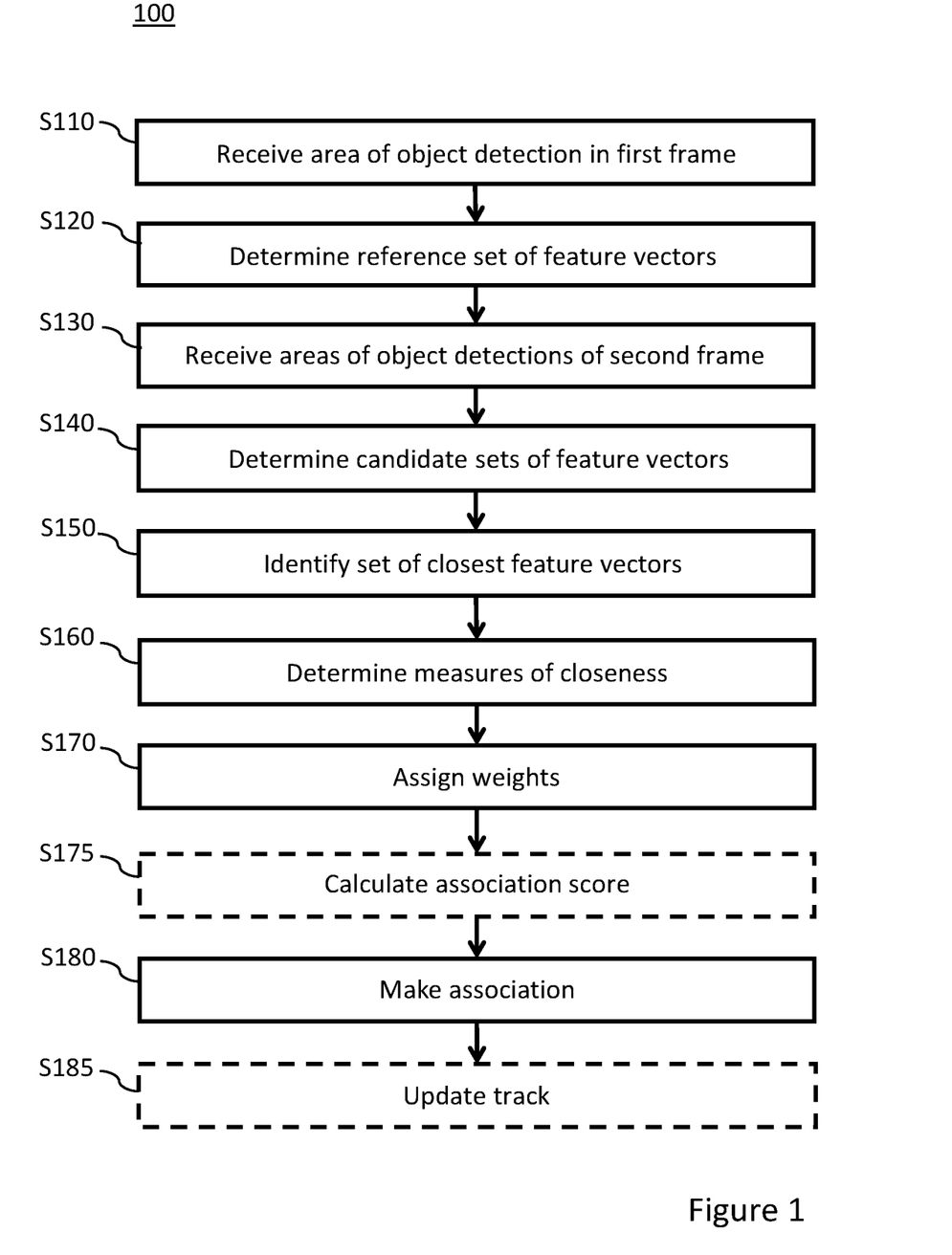
FIG. 1 shows a flow chart in relation to embodiments of a method of the present disclosure for associating an object detection in a first frame with an object detection in a second frame using a convolutional neural network.
Figure 2A:
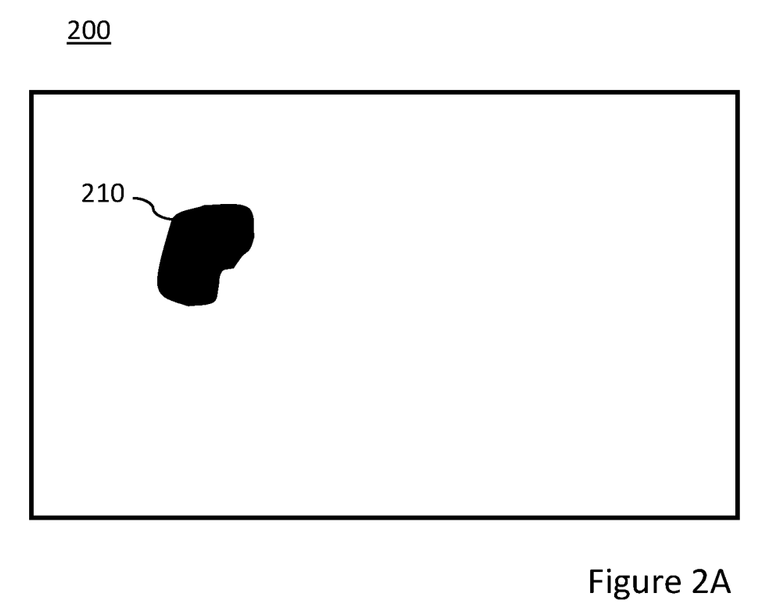
FIG. 2A shows an illustration of a first frame including an object.
Figure 2B:
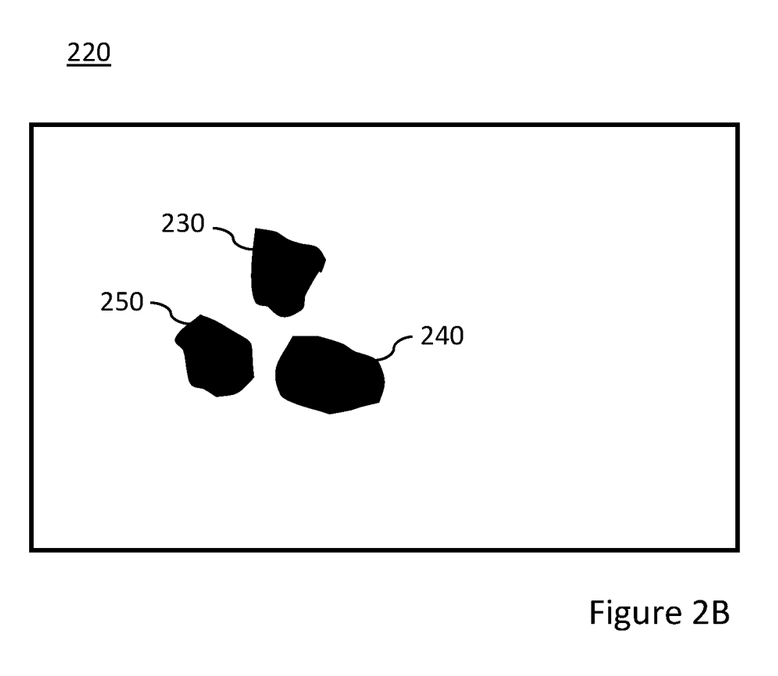
FIG. 2B shows an illustration of a second frame including a plurality of objects.
Figure 3:
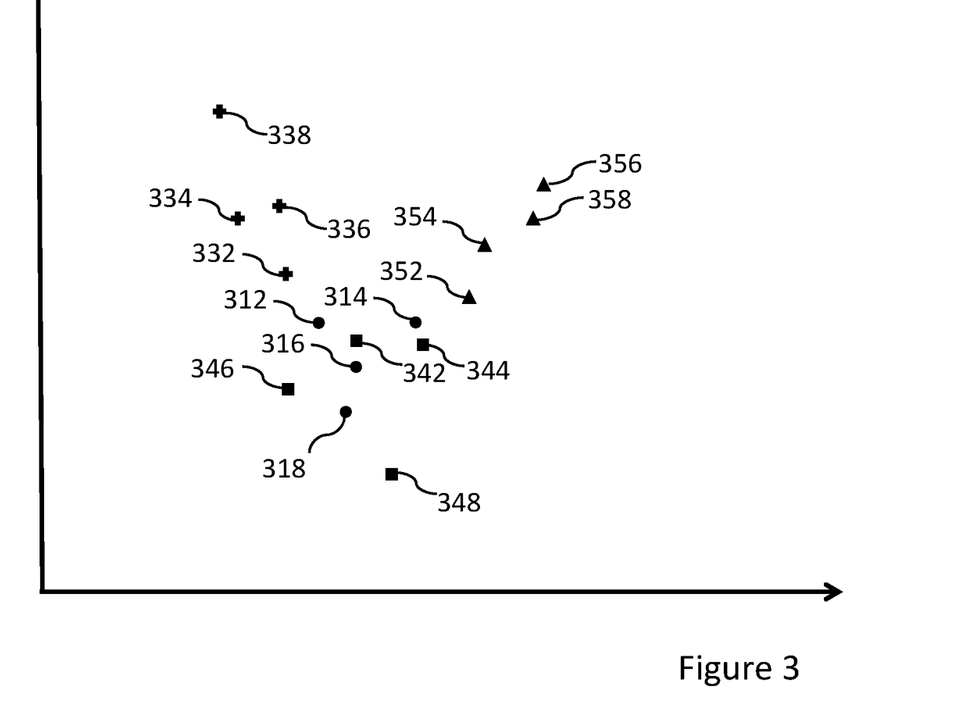
FIG. 3 shows a simplified representation of feature vectors corresponding to the object in the first frame illustrated in FIG. 2A and to the plurality objects in the second frame illustrated in FIG. 2B in a two-dimensional space.

Embodiments of a method for associating an object detection in a first frame with an object detection in a second frame using a convolutional neural network will now be described in relation to FIG. 1 showing a flow chart 100 together with FIGS. 2A and 2B showing illustrations of a first frame 200 including an object 210, and a second frame 220 including a plurality of objects, namely a first object 230, a second object 240, and a third object 250, and FIG. 3 showing a simplified representation of feature vectors corresponding to the object in the first frame 200 illustrated in FIG. 2A and the plurality of objects in the second frame 220 illustrated in FIG. 2B in a two-dimensional space.

The steps of the method illustrated in relation to FIG. 1 may be performed for a sequence of frames. Hence, the method may have previously been performed in relation to a further previous frame as a first frame and the first frame 200 of FIG. 2A as a second frame. Similarly, the method may subsequently be performed in relation to the second frame 220 of FIG. 2B as a first frame and a further subsequent frame as a second frame.

The convolutional neural network has been trained to determine feature vectors such that feature vectors of object detections relating to separate objects are arranged in separate clusters in a feature vector space. By object detections relating to separate objects is meant object detections that do not relate to the same instance of an object. For example, the separate objects may be different instances of the same object type or objects of different types.

Feature vectors may first be determined for a frame by determining one feature vector for each sub-area of a plurality of sub-areas the frame, where the plurality of sub-areas preferably together forms the complete frame. For example, the frame may be divided in a grid of sub-areas of n×n pixels, where n is a positive non-zero integer. For example, one feature vector can be determined per pixel in the frame, but typically the spatial resolution of the feature vectors is lower than that, e.g., one feature vector per 8×8 pixels. After feature vectors for the whole frame have been determined, feature vectors of an object detection of the frame may then be determined by identifying the feature vectors of the sub-areas of the frame that are within an area corresponding to the object detection.

The training may be done by any known training method achieving the desired properties of the convolutional neural network, i.e., that feature vectors of object detections relating to separate objects are arranged in separate clusters in a feature vector space. Such training may for example be based on a loss function that encourages the convolutional neural network to map each sub-area of a frame to a feature vector in a feature vector space so that sub-areas belonging to the same object (i.e., the same instance of an object type) are mapped to feature vectors that lie close together in the feature vector space while sub-areas belonging to different objects (i.e., different instances of the same object type or different object types) are mapped to feature vectors that lie far apart in the feature vector space. The distance between feature vectors may for example be defined as the Euclidian distance in the feature vector space. Such a loss function may comprise a sum over all sub-area pairs of each of a number of training frames. Each term of the sum may for example include a first sub-term for sub-area pairs belonging to the same object, which first sub-term provides a small contribution for a low value of the distance between corresponding feature vectors and a large contribution for a high value of the distance between corresponding mapped feature vectors, and a second sub-term for sub-area pairs belonging to different objects, which second sub-term provides a small contribution for a high value of the distance between corresponding feature vectors and large contribution for a low value of the distance between corresponding feature vectors. Each term of the sum may further be normalized in relation to the total number of pixels in the respective training image and weighted by means of pixel pair weights for the respective pixel and training image. An example of a neural network that can be used and how it is trained is provided in "Recurrent Pixel Embedding for Instance Grouping" by Kong, Shu et al., Department of Computer Science, University of California, USA, 22 Dec. 2017 (arXiv: 1712.08273v1). Another example of a neural network that can be used is provided in "Semantic Instance Segmentation with a Discriminative Loss Function" by De Brabandere et al., ESAT-PSI, KU Leuven, Belgium. 8 Aug 2017 (arXiv: 1708.02551v1). A further example is provided in "Semantic Instance Segmentation via Deep Metric Learning" by Fathi et al., Google Inc. and UCLA, USA, 30 Mar. 2017 (arXiv:

1703.10277v1). For the purposes of this application, the COCO data set available at cocodataset.org, may be used for the training.

For embodiments where there are objects of different object types the convolutional neural network needs to be trained using images including objects of different object types and such that pixels belonging to objects of different object types are mapped to feature vectors that lie far apart in the feature vector space. This would for example be achieved by training any of the above referenced neural networks using the COCO data set.

In the method an area of the first frame is received S110 corresponding to the object detection in the first frame. For example, in the first frame 200 illustrated in FIG. 2A, the object 210 has been detected. The area corresponding to this object detection is the area of the object 210 having a specific size, shape and location in the first frame 200. The object detection may for example be determined by means of an algorithm for object instance segmentation that provides information regarding different object detections and locations in the image of the object detections. The information regarding locations may be in the form masks that can be used to mask out areas corresponding to the object detections. An example of an object instance segmentation algorithm that can be used is mask R-CNN described in the paper "Mask R-CNN" by He et al. from 14 Jan. 2018 (arXiv:17.03.06870v3). That paper describes the framework of the mask R-CNN, how it is trained, and suitable training data.

A reference set of feature vectors is determined S120 as a set of feature vectors associated with the received area in the first frame. For this purpose, the trained convolutional neural network described above may be used. A complete set of feature vectors may be determined for the first frame by determining one feature vector for each sub-area of a plurality of sub-areas the frame, wherein the plurality of sub-areas preferably together forms the complete frame. The reference set of feature vectors may then be determined by identification of the feature vectors of the complete set of feature vectors that are associated with sub-areas located with the received area of the first frame. Alternatively, it is sufficient that only feature vectors associated with the received area are determined for the first frame. The reference set of feature vectors may then be determined by determining feature vectors for sub-areas located within the received area of the first frame. In relation to the object 210 in the first frame 200 illustrated in FIG. 2A, a reference set of feature vectors would be determined as the set of feature vectors for sub-areas located within the area of the object 210.

The reference set of feature vectors comprises two or more feature vectors. This can be achieved by selecting sizes of sub-areas for which a respective feature vector is determined such that the area corresponding to the object detection comprises at least two sub-areas. Alternatively, or additionally, only objects of at least a minimum size in relation to the size of sub-areas such that the objects each has at least a certain number of feature vectors are allowed for association. This is beneficial since in order to be able to successfully do association (reidentification), the object needs to be of a reasonable size. Furthermore, the more feature vectors there are for an object, the more spatial variation of the object can be taken into account and the more statistical basis there is for the association. The certain number of feature vectors may be two but will normally be larger than that.

A plurality of areas of the second frame are further received S130 corresponding to respective ones of a plurality of object detections in the second frame. For example, in the second frame 220 illustrated in FIG. 2B, the objects 230, 240, 250 have been detected. The plurality of areas corresponding to this plurality of object detections is the areas of the objects 230, 240, 250 having a specific sizes, shapes and locations in the second frame 220. These object detections may also be determined using an object segmentation algorithm, such as mask-RCNN described above.

A plurality of candidate sets of feature vectors is then determined S140 as a plurality of sets of feature vectors associated with the received plurality of areas in the second frame. For this purpose, the trained convolutional neural network may be used. As described in relation to the first frame, a complete set of feature vectors may be determined also for the second frame. The candidate sets of feature vectors may then be determined by identification, for each object detection of the plurality of object detections of the second frame, of the feature vectors of the complete set of feature vectors that are associated with sub-areas located within the area corresponding to that object detection. Alternatively, it is sufficient that only feature vectors associated with the received plurality of areas are determined for the second frame. The candidate sets of feature vectors may then be determined by determining, for each area of the received plurality of areas, feature vectors for sub-areas located within that received area. In relation to the objects 230, 240, 250 in the second frame 220 illustrated in FIG. 2B, a plurality of candidate sets of feature vectors would be determined, for each of the plurality of objects 230, 240, 250, as the set of feature vectors for sub-areas located within the area of that object.

A set of closest feature vectors is then identified S150 by identifying, for each feature vector of the reference set of feature vectors, a predetermined number of feature vectors among the plurality of candidate sets of feature vectors, which predetermined number of feature vectors have smallest distances in the feature vector space to that feature vector of the reference set. For this purpose, the same distance metric used when training the convolution neural may be used, although there may be other choices. Hence, for each feature vector of the reference set, a distance in the feature vector space is determined to each feature vector of the plurality of candidate sets of feature vectors and the predetermined number of feature vectors of the plurality of candidate sets of feature vectors that have the smallest distances are included in the set of closest feature vectors.

The predetermined number of feature vectors is preferably less or equal to the number of feature vectors of the candidate set having the least number of feature vectors. For example, if there is set a certain lower limit for the number of feature vectors of each object, the predetermined number may be set to be below that certain lower limit. This is advantageous since then all feature vectors of a single object can be closest in the feature vector space to each vector of the reference set.

The predetermined number of feature vectors can be set to one, but it may be advantageous to set it to a larger number since then the influence of outliers is reduced, i.e., the influence of feature vectors of the reference set and the candidate sets that is located at a relatively long distance in the feature vector space away from the other feature vectors of the same reference set or candidate set. The predetermined number of feature vectors may for example be set to a certain percentage the number of feature vectors of the candidate set having the least number of feature vectors.

FIG. 3 shows a simplified representation of feature vectors corresponding to the object 210 in the first frame 200 illustrated in FIG. 2A and the plurality of objects 230, 240, 250 in the second frame 220 illustrated in FIG. 2B in a two-dimensional space. The feature vectors are represented as different geometrical shapes in points in the two-dimensional space. For the object 210 in the first frame 200 illustrated in FIG. 2A, a reference set of feature vectors consisting of four feature vectors has been determined. In FIG. 3, the four feature vectors, consisting of a first feature vector 312, a second feature vector 314, a third feature vector 316, and a fourth feature vector 318 of the reference set are represented as the four circles. For the first object 230 in the second frame 220 illustrated in FIG. 2B, a first candidate set of feature vectors consisting of three feature vectors has been determined. In FIG. 3, the three feature vectors consisting of a first feature vector 332, a second feature vector 334, a third feature vector 336, and a fourth feature vector 338 of the first candidate set are represented as the four plus signs. For the second object 240 in the second frame 220 illustrated in FIG. 2B, a second candidate set of feature vectors consisting of four feature vectors has been determined. In FIG. 3, the four feature vectors consisting of a first feature vector 342, a second feature vector 344, a third feature vector 346, and a fourth feature vector 348 of the second candidate set are represented as the four squares. For the third object 250 in the second frame 220 illustrated in FIG. 2B, a second candidate set of feature vectors consisting of four feature vectors has been determined. In FIG. 3, the four feature vectors consisting of a first feature vector 352, a second feature vector 354, a third feature vector 356, and a fourth feature vector 358 of the second candidate set are represented as the four triangles. The number of feature vectors for the reference set and each of the candidate sets are all four. This is only for purpose of illustration. Typically, the number of feature vectors may be ten, hundreds or more. Furthermore, the number of feature vectors of the reference set may differ from the number of feature vectors of each of the candidate sets and the number of feature vectors may differ between the candidate sets. For a predetermined number of feature vectors having smallest distances equal to four, and the distance being the Euclidian distance in two-dimensional space, the feature vectors having smallest distances to each feature vector of the reference set are as follows. For the first feature vector 312 of the reference set, the four closest feature vectors of the candidate sets are the first feature vector 332 of the first candidate set, and the first feature vector 342, the second feature vector 344, and the third feature vector 346 of the second candidate set. For the second feature vector 314 of the reference set, the four closest feature vectors of the candidate sets are the first feature vector 342 and the second feature vector 344 of the second candidate set, and the first feature vector 352 and the second feature vector 354 of the third candidate set. For the third feature vector 316 of the reference set, the four closest feature vectors of the candidate sets are the first feature vector 332 of the first candidate set, the first feature vector 342 and the second feature vector 344 of the second candidate set, and the first feature vector 352 of the third candidate set. For the fourth feature vector 318 of the reference set, the four closest feature vectors of the candidate sets are the first feature vector 342, the second feature vector 344, the third feature vector 346 and the fourth feature vector 348 of the second candidate set. This summarized in Table 1 below.

TABLE 1

| Feature vector of reference set | Feature vectors of candidate sets with smallest distances | | |
|---|---|---|---|
| | First candidate set | Second candidate set | Third candidate set |
| 312 | 332 | 342, 344, 346 | — |
| 314 | — | 342, 344 | 352, 354 |
| 316 | 332 | 342, 344 | 352 |
| 318 | — | 342, 344, 346, 348 | — |

Turning back to FIG. 1, a measure of closeness to the reference set of feature vectors is determined S160 for each candidate set of feature vectors of the plurality of candidate sets of feature vectors. The measure of closeness is determined as a proportion of the set of closest feature vectors that belong to that candidate set of feature vectors.

As can be seen in Table 1, the total number feature vectors of the set of closest feature vectors of the candidate sets is 16. For the first candidate set the first feature vector 332 is included two times in the set of closest feature vectors. Hence, the measure of closeness of the first candidate set is $2/16$. For the second candidate set, both the first feature vector 342 and the second feature vector 344 are included four times, the third feature vector 346 is included two times and the fourth feature vector is included one time in the set of closest feature vectors. Hence, the measure of closeness of the second candidate set is $11/16$. For the third candidate set, the first feature vector 352 is included two times, and the second feature vector 354 is included one time in the set of closest feature vectors. Hence, the measure of closeness of the third candidate set is $3/16$.

A weight is assigned S170 for each of the plurality of object detections in the second frame. Each weight is based on the determined measure of closeness to the reference set of feature vectors of the candidate set of feature vectors corresponding to that object detection is assigned S170. Hence, in relation to FIG. 2B, a first weight assigned to the first object 230 is based on the determined measure of closeness of the first candidate set, a second weight assigned to the second object 240 is based on the determined measure of closeness of the second candidate set, and a third weight assigned to the third object 250 is based on the determined measure of closeness of the third candidate set.

As the assigned weights are based on a measure of closeness to the reference set corresponding to the object detection in the first frame of the respective candidate sets corresponding to the object detections in the second frame and the way the measure of closeness is determined, the assigned weights will typically indicate a measure of similarity of appearance between the object in the first frame and each of the objects in the second frame. The weights may also be called appearance-based weights.

By selecting a higher predetermined number of feature vectors having the smallest distances in the feature vector space, the influence on the measure of closeness of a few outliers of the candidate sets will be reduced such that the measure of closeness will, to a large extent, depend on the feature vectors that are located closer to centres of the candidate sets in the feature vector space.

The assigned weights are preferably such that, if two object detections of the plurality of object detections in the second frame have the same measure of closeness, the assigned weight to each of them is the same, and if a first object detection has a higher measure of closeness than a second object detection, the assigned weight is higher for the first object detection than for the second object detection. Furthermore, the assigned weights to the object detections may be proportional to the determined measure of closeness of the respective candidate set.

The object detection in the first frame is then associated S180 with one object detection of the plurality of object detections in the second frame based on the assigned weights. For example, the assigned weights may be used to calculate S175 an association score for each combination of one object detection of the plurality of object detections in the second frame and the object detection in the first frame. Each association score indicates a probability that that the relevant object detection in the second frame and the object detection in the first frame relate to the same object and is based on the weight for the relevant object detection in the second frame in relation to the object detection in the first frame. The object detection in the first frame may then be associated S180 with the object detection of the plurality of object detections in the second frame having the highest association score.

If, for example, the weights and association scores are to be based only on similarity of appearance between each of the plurality of objects in the second frame and the object in the first frame, the weight for each object detection of the plurality of object detections in the second frame may be set to be equal to the measure of closeness of that object detection to the object detection of the first frame. The association score for each object detection of the plurality of object detections in the second frame in relation to the object detection in the first frame can then be set to be equal to the weight of that object detection.

For the objects 230, 240, 250 in the second frame 220 illustrated in FIG. 2B, and the measure of closeness determined based on Table 1, the weight and the association score for the first object 230 would then be 2/16. The weight and association score for the second object 240 would be 11/16. The weight and association score for the third object 250 would be 3/16.

Each of the association scores may further be based on a predicted state in the second frame of the object detection in the first frame, e.g., based on Kalman filter state variables. The predicted state may comprise one or more of a predicted size, predicted shape, predicted location, predicted speed, and acceleration. The predicted state in the second frame of the object detection in the first frame is typically based on a track to which the object detection in the first frame relates. The track is updated with a determined state in each frame after association to an object detection. It is to be noted that the determined state after association need not be identical to features of the object detection to which association has been made. For example, the determined state may differ in terms of one or more of size, shape, location, speed, and acceleration to that of the associated object detection. The predicted state in the second frame of the object detection in the first frame can be compared to each of the object detections in the second frame to determine a probability that that object detection in the first frame and the relevant object detection in the second frame relate to the same object. For example, a distance $d_j$ may be determined as a difference between the predicted state in the second frame of the object detection in the first frame and the j:th object detection in the second frame. The distance $d_j$ may simply be a distance between centre points of objects based on the predicted state in the second frame of the object detection in the first frame and the j:th object detection in the second frame or it may be based on overlap of objects based on the predicted state in the second frame of the object detection in the first frame and the j:th object detection in the second frame, e.g., as measured by an intersection over union.

The distance $d_j$ may be translated into a probability that the object detection in the first frame corresponds to the j:th object detection in the second frame. For example, a Gaussian curve, or other curve that decays with increasing distance, may be used to translate the distance into a probability. By way of example, a probability $P_j$ that the object detection in the first frame corresponds to the j:th object detection in the second frame may be calculated according to:

$$P_j = e^{-\frac{1}{2}\left(\frac{d_j}{\sigma}\right)^2} \qquad \text{Equation 1}$$

where $\sigma$ is a predefined constant.

The distance $d_j$ may be modified based on an appearance-based weight $w_j$ that is calculated based on the measure of closeness. For example, the distance may be divided by the weight, and possibly rescaled by a constant. Based on such modification of the distance, a modified probability, or association score, may be calculated according to:

$$P_j = e^{-\frac{1}{2}\left(\frac{d_j}{\sigma \alpha w_j}\right)^2} \qquad \text{Equation 2}$$

where $\alpha$ is a constant that governs the impact of the appearance-based weights.

When using appearance-based weights to modify probabilities based on predicted state, the assigned weights may be such that, for each of the plurality object detections in the second frame, the assigned weight is one plus a difference between the measure of closeness of that object detection and the average measure of closeness of the object detections of the plurality of object detections in the second frame other than that object detection. Hence, if there are m object detections in the second frame and the measure of closeness of the j:th object detection in the second frame to the object detection in the first frame is denoted $a_j$, the weight $w_j$ for the j:th object detection is calculated according to:

$$w_j = 1 + \left(a_j - \frac{1}{m-1}\Sigma_{i \neq j} a_i\right) \qquad \text{Equation 3}$$

For the objects 230, 240, 250 in the second frame 220 illustrated in FIG. 2B, and the measure of closeness determined based on Table 1, the weight $w_1$ for the first object 230 according to Equation 2 would be 1+(2/16−1/2*(11/16+3/16))=22/32. The weight $w_2$ for the second object 240 according to Equation 1 would be 1+(11/16−1/2*(2/16+3/16))=49/32. The weight $w_3$ for the third object 250 according to Equation 1 would be 1+(3/16−1/2*(2/16+11/16))=25/32.

The object detection in the first frame may then be associated S180 with the object detection of the plurality of object detections in the second frame having the highest modified probability, i.e., the highest association score.

The associations may for example be used in relation to updating a track relating to the object detection in the first frame based on the plurality of object detections in the second frame. The track may then be updated S185 based on the object detection in second frame with which that object detection in the first frame is associated.

In the above it has been described how one object detection in a first frame is associated to one object detection of a plurality of object detections in a second frame. The method of the present disclosure is however also applicable to a case where a plurality of object detections in the first frame is to be associated to a plurality of object detections in the second frame. In such a scenario, respective weights are assigned to each object detections of the plurality of object detections in the second frame in relation to each object detection of the plurality of object detections in the first frame.

The plurality of object detections in the first frame may then be associated S180 with respective ones of the plurality of object detections in the second frame based on the assigned weights. For example, the assigned weights may be used to calculate S175 an association score for each combination of one object detection of the plurality of object detections in the second frame and one object detection of the plurality of object detections in the first frame. Each association score indicates a probability that that the relevant object detection in the second frame and the relevant object detection in the first frame relate to the same object and is based on the weight for the relevant object detection in the second frame in relation to the relevant object detection in the first frame. The association scores may then be used in an algorithm that associates each object detection of the plurality of object detections in the first frame to at most one object detection of the plurality of object detections in the second frame such that each object detection of the object detections in the second frame are associated to at most one object detection of the plurality of object detections in the first frame. If, for example, the Hungarian algorithm is used to associate each of the object detections in the first frame (previous frame) to at most one object detection of the plurality of object detections in the second frame (current frame), the inputs to the Hungarian algorithm are probabilities that say how likely it is for each object detection of the plurality detections in the second frame, that the object detection in the first frame is associated to that object detection in the second frame, i.e., that they are the same object. Hence, the association scores may be calculated as such probabilities. If, for example, the weights and association scores are to be based only on similarity of appearance between each of the plurality of objects in the second frame and each of the plurality of objects in the first frame, the weight for each object detection of the plurality of object detections in the second frame in relation to each object detection of the plurality of object detections in the first frame may be set to be equal to the corresponding measure of closeness of each object detection of the plurality of object detections in the second frame in relation to each object detection of the plurality of object detections in the first frame. The association score for each object detection of the plurality of object detections in the second frame in relation to each object detection of the plurality of object detections in the first frame can then be set to be equal to the corresponding weight for each object detection of the plurality of object detections in the second frame in relation to each object detection of the plurality of object detections in the first frame.

Additionally, the algorithm for association may include a threshold below which an object detection in the first frame is not associated to any object detection in the second frame. In such a case, a track to which the object detection in the first frame is related is said to lose the tracking. The tracking can then be ended or a timeout can be used where the track is updated based on predicted state only without use of any associated object detection in the second frame to see if an association can be made in a later frame. Furthermore, the algorithm may further support creation of respective new tracks in relation to object detections in the second frame which are not associated to any object detection in the first frame. In order for not creating new tracks based on object detections in the second frame which only appear in one or a few frames and are due to noise, a delay may be used such that a new track is only created if the object detection is persistently made for more than a predetermined number of frames.

Each of the association scores may further be based on a predicted state in the second frame of the respective object detection of the plurality of object detections in the first frame, e.g., based on Kalman filter state variables. The predicted state may comprise one or more of a predicted size, predicted shape, predicted location, predicted speed, and acceleration. The predicted state in the second frame of the respective object detection of the plurality of object detections in the first frame is typically based on a track to which the respective object detection of the plurality of object detections in the first frame relates. The track is updated with a determined state in each frame after association to an object detection. It is to be noted that the determined state after association need not be identical to features of the object detection to which association has been made. For example, the determined state may differ in terms of one or more of size, shape, location, speed, and acceleration to that of the associated object detection. For each object detection of the plurality of object detections in the first frame, the predicted state in the second frame of that object detection in the first frame can be compared to the object detections in the second frame to determine a probability that that object detection in the first frame and the relevant object detection in the second frame relate to the same object. For example, a distance $d_{kj}$ may be determined as a difference between the predicted state in the second frame of the k:th object detection in the first frame and the j:th object detection in the second frame. The distance $d_{kj}$ may simply be a distance between centre points of objects based on the predicted state in the second frame of the k:th object detection in the first frame and the j:th object detection in the second frame or it may be based on overlap of objects based on the predicted state in the second frame of the k:th object detection in the first frame and the j:th object detection in the second frame, e.g., as measured by an intersection over union.

The distance $d_{kj}$ may be translated into a probability that the k:th object detection in the first frame corresponds to the j:th object detection in the second frame. For example, a Gaussian curve, or other curve that decays with increasing distance, may be used to translate the distance into a probability. By way of example, a probability $P_{kj}$ that the k:th object detection in the first frame corresponds to the j:th object detection in the second frame may be calculated according to:

$$P_{kj} = e^{-\frac{1}{2}\left(\frac{d_{kj}}{\sigma}\right)^2} \qquad \text{Equation 4}$$

where $\sigma$ is a predefined constant.

The distance $d_{kj}$ may be modified based on the appearance-based weight $w_{kj}$ calculated based on the measures of closeness. For example, the distance may be divided by the weight, and possibly rescaled by a constant. Based on such modification of the distance, a modified probability, or association score, may be calculated according to:

$$P_{kj} = e^{-\frac{1}{2}\left(\frac{d_{kj}}{\sigma \alpha w_{kj}}\right)^2} \quad \text{Equation 5}$$

where α is a constant that governs the impact of the appearance-based weights.

When using appearance-based weights to modify probabilities based on predicted state, the assigned weights for a plurality of object detections in the first frame may each be calculated in the same way as described in relation to assigned weights for one object detection in the first frame. For example, if there are m object detections in the second frame and the measure of closeness to the k:th object detection in the first frame of the j:th object detection in the second frame is denoted $a_{kj}$, the weight $w_{kj}$ for the k:th object detection in the first frame in relation to the j:th object detection in the second frame is calculated according to:

$$w_{kj} = 1 + \left(a_{kj} - \frac{1}{m-1}\Sigma_{i\neq j}a_{ki}\right) \quad \text{Equation 6}$$

Each object detection of the plurality of object detections in the first frame may then be associated S180 with the object detection of the plurality of object detections in the second frame having the highest association score. In alternative, the association scores may then be used in an algorithm that associates each object detection of the plurality of object detections in the first frame to at most one object detection of the plurality of object detections in the second frame such that each object detection of the object detections in the second frame are associated to at most one object detection of the plurality of object detections in the first frame. If, for example, the Hungarian algorithm is used, the association scores may be determined based on the assigned weights and predicted states such that they indicate probabilities $P_{kj}$ that indicate how likely it is for the k:th object detection in the first frame is associated to the j:th object detection of the plurality of object detections in the second frame, i.e., that they are the same object, e.g., according to Equation 5.

The associations may for example be used in relation to updating tracks relating to the plurality of object detections in the first frame based on the plurality of object detections in the second frame. For each object detection of the plurality of object detections in the first frame, the corresponding track may then be updated S185 based on the object detection in second frame with which that object detection in the first frame is associated.

Figure 4:
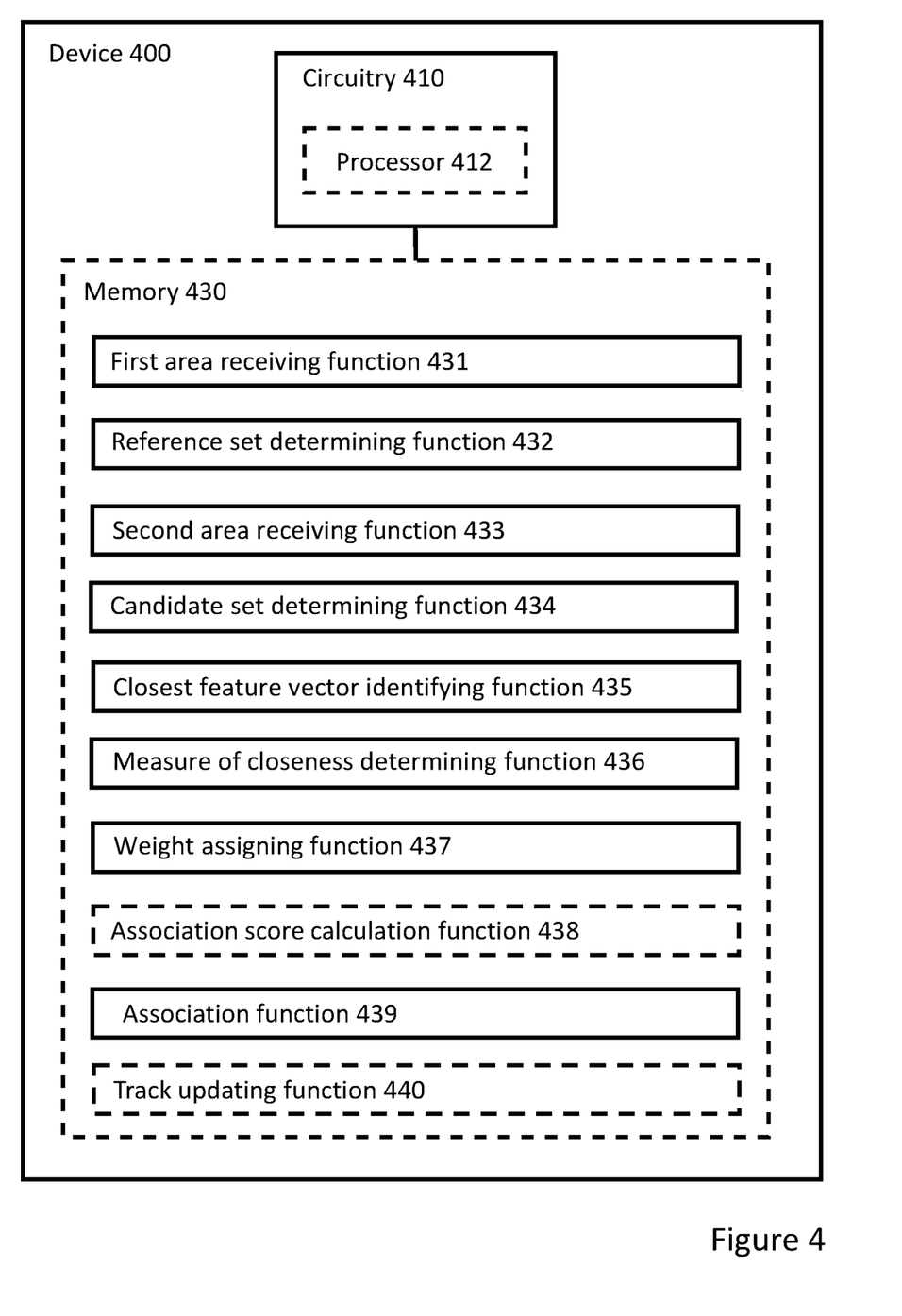
FIG. 4 shows a schematic diagram in relation to embodiments of a device of the present disclosure for associating an object detection in a first frame with an object detection in a second frame using a convolutional neural network.

FIG. 4 shows a schematic diagram in relation to embodiments of a device 400 of the present disclosure for associating an object detection in a first frame with an object detection in a second frame using a convolutional neural network. The device 400 comprises circuitry 410. The circuitry 410 is configured to carry out functions of the device 400. The circuitry 410 may include a processor 412, such as a central processing unit (CPU), microcontroller, or microprocessor. The processor 412 is configured to execute program code. The program code may for example be configured to carry out the functions of the device 400.

The device 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as system memory for the circuitry 410. The memory 430 may exchange data with the circuitry 410 over a data bus. Accompanying control lines and an address bus between the memory 430 and the circuitry 410 also may be present.

Functions of the image processing device 400 may be embodied in the form of executable logic routines (e.g., lines of code, software programs, etc.) that are stored on a non-transitory computer readable medium (e.g., the memory 430) of the device 400 and are executed by the circuitry 400 (e.g., using the processor 412). Furthermore, the functions of the device 400 may be a stand-alone software application or form a part of a software application that carries out additional tasks related to the device 400. The described functions may be considered a method that a processing unit, e.g., the processor 412 of the circuitry 410 is configured to carry out. Also, while the described functions may be implemented in software, such functionality may as well be carried out via dedicated hardware or firmware, or some combination of hardware, firmware and/or software.

The circuitry 410 is configured to execute a first area receiving function 431 configured to receive an area of the first frame corresponding to the object detection in the first frame, and a reference set determining function 432 configured to determine, by the trained convolutional neural network, a set of feature vectors associated with the area in the first frame comprising two or more feature vectors, thereby determining a reference set of feature vectors comprising two or more feature vectors.

The circuitry 410 is further configured to execute a second area receiving function 433 configured to receive a plurality of areas of the second frame corresponding to respective ones of a plurality of object detections in the second frame, and a candidate set determining function 434 configured to, for each of the plurality of areas in the second frame, determine, by the trained convolutional neural network, a set of feature vectors associated with that area in the second frame, thereby determining a plurality of candidate sets of feature vectors.

The circuitry 410 is further configured to execute a closest feature vectors identifying function 435 configured to, for each feature vector of the reference set of feature vectors, identify, among the feature vectors of the plurality of candidate sets of feature vectors, a predetermined number of feature vectors having smallest distances in the feature vector space to that feature vector of the reference set of feature vectors, thereby identifying a set of closest feature vectors.

The circuitry 410 is further configured to execute a measure of closeness determining function 436 configured to, for each candidate set of feature vectors of the plurality of candidate sets of feature vectors, determine a measure of closeness to the reference set of feature vectors as a proportion of the set of closest feature vectors that belonging to that candidate set of feature vectors.

The circuitry 410 is further configured to execute a weight assigning function 437 configured to, for each of the plurality of object detections in the second frame, assign a weight based on the determined measure of closeness to the reference set of feature vectors of the candidate set of feature vectors corresponding to that object detection.

The circuitry 410 is further configured to execute an association function 439 configured to associate the object detection in the first frame with one object detection of the plurality of object detections in the second frame based on the assigned weights.

The weight assigning function 437 may be configured to assigned weights such that, for any two object detections of the plurality of object detections in the second frame having the same measure of closeness, the assigned weight is the same for the two object detections, and for any object detection of the plurality of object detections in the second frame having a higher measure of closeness than another object detection of the plurality of object detections in the second frame, the assigned weight is higher for said any object detection than the assigned weight for said another object detection.

The circuitry 410 may be further configured to execute an association score calculation function 438 configured to, for each object detection of the plurality of object detections in the second frame, calculate, based on the weight for that object detection, an association score indicating a probability that that object detection in the second frame is associated with the object detection in the first frame. The association score may be further based on a predicted state in the second frame of the object detection in the first frame. The predicted state may comprise one or more of a predicted size, predicted shape, predicted location, predicted speed, and acceleration.

The association function 439 may be configured to associate the object detection in the first frame is with an object detection of the plurality of object detections in the second frame having the highest association score.

The object detection in the first frame may be associated to a track, and the circuitry may be further configured to execute a track updating function 440 configured to update the track based on the object detection in second frame with which the object detection in the first frame is associated.

The functions carried out by the circuitry 410 may be further adapted as the corresponding steps of the embodiments of the method described in relation to FIG. 1, FIGS. 2A and 2B, and FIG. 3.

A person skilled in the art realizes that the present concepts are not limited to the embodiments described above. On the contrary, many modifications and variations are possible within the scope of the appended claims. Such modifications and variations can be understood and effected by a skilled person in practicing the claims, from a study of the drawings, the disclosure, and the appended claims.

The invention claimed is:

1. A method for associating an object detection in a first frame with an object detection in a second frame using a convolutional neural network trained to determine feature vectors such that feature vectors of object detections relating to separate objects are arranged in separate clusters in a feature vector space, comprising:
   receiving an area of the first frame corresponding to the object detection in the first frame;
   determining, by the trained convolutional neural network, a set of feature vectors associated with the area in the first frame comprising two or more feature vectors, thereby determining a reference set of feature vectors associated with the object detection in the first frame comprising two or more feature vectors;
   receiving a plurality of areas of the second frame corresponding to respective ones of a plurality of object detections in the second frame;
   for each of the plurality of areas in the second frame, determining, by the trained convolutional neural network, a set of feature vectors associated with that area in the second frame comprising two or more feature vectors, thereby determining a plurality of candidate sets of feature vectors, each candidate set of feature vectors comprising two or more feature vectors;
   for each feature vector of the reference set of feature vectors, identifying, among the feature vectors of the plurality of candidate sets of feature vectors, a predetermined number of feature vectors having smallest distances in the feature vector space to that feature vector of the reference set of feature vectors, thereby identifying a set of closest feature vectors;
   for each candidate set of feature vectors of the plurality of candidate sets of feature vectors, determining a measure of closeness to the reference set of feature vectors as a proportion of the set of closest feature vectors that belong to that candidate set of feature vectors, wherein the predetermined number is set such that the influence of outliers of the reference set and the candidate sets on the measure of closeness is reduced, wherein the outliers of the reference set and the candidate sets are feature vectors that are located at above a threshold distance in the feature vector space away from the other feature vectors of the same of the reference set and the candidate sets, respectively;
   for each of the plurality of object detections in the second frame, assigning a weight based on the determined measure of closeness to the reference set of feature vectors of the candidate set of feature vectors corresponding to that object detection; and
   associating the object detection in the first frame with one object detection of the plurality of object detections in the second frame based on the assigned weights.

2. The method of claim 1, wherein:
for any two object detections of the plurality of object detections in the second frame having the same measure of closeness, the assigned weight is the same for the two object detections; and
for any object detection of the plurality of object detections in the second frame having a higher measure of closeness than another object detection of the plurality of object detections in the second frame, the assigned weight is higher for said any object detection than the assigned weight for said another object detection.

3. The method of claim 1, wherein
for each of the plurality of object detections in the second frame, the assigned weight is proportional to the determined measure of closeness to the reference set of feature vectors of the candidate set of feature vectors corresponding to that object detection.

4. The method of claim 1, wherein
for each of the plurality object detections in the second frame, the assigned weight is one plus a difference between the measure of closeness of that object detection and the average measure of closeness of the object detections of the plurality of object detections in the second frame other that object detection.

5. The method of claim 1, further comprising:
for each object detection of the plurality of object detections in the second frame, calculating, based on the weight for that object detection, an association score indicating a probability that that object detection in the second frame is associated with the object detection in the first frame.

6. The method of claim 5, wherein the association score is further based on a predicted state in the second frame of the object detection in the first frame.

7. The method of claim 6, wherein the predicted state comprises one or more of a predicted size, predicted shape, predicted location, predicted speed, and acceleration.

8. The method of claim 1, wherein the object detection in the first frame is associated with an object detection of the plurality of object detections in the second frame having the highest association score.

9. The method of claim 1, wherein the object detection in first frame is associated to a track, further comprising:
updating the track based on the object detection in second frame with which the object detection in the first frame is associated.

10. The method of claim 1, wherein the act of determining, by the trained convolutional neural network, a set of feature vectors associated with the area in the first frame comprises:
determining, by the trained convolutional neural network, a first plurality of feature vectors for a plurality of sub-areas of the first image frame; and
identifying a set of feature vectors of the first plurality of feature vectors associated with the area in the first frame comprising two or more feature vectors, thereby determining a reference set of feature vectors comprising two or more feature vectors,
and wherein the act of, for each of the plurality of areas in the second frame, determining, by the trained convolutional neural network, a set of feature vectors associated with that area in the second frame comprises:
determining, by the trained convolutional neural network, a second plurality of feature vectors for a plurality of sub-areas of the second image frame; and
for each of the plurality of areas in the second frame, identifying a set of feature vectors associated with that area in the second frame, thereby determining a plurality of candidate sets of feature vectors.

11. A non-transitory computer-readable storage medium having stored thereon instructions for implementing a method for associating an object detection in a first frame with an object detection in a second frame using a convolutional neural network trained to determine feature vectors such that feature vectors of object detections relating to separate objects are arranged in separate clusters in a feature vector space, when executed by a device having processing capabilities, the method comprising:
receiving an area of the first frame corresponding to the object detection in the first frame;
determining, by the trained convolutional neural network, a set of feature vectors associated with the area in the first frame comprising two or more feature vectors, thereby determining a reference set of feature vectors associated with the object detection in the first frame comprising two or more feature vectors;
receiving a plurality of areas of the second frame corresponding to respective ones of a plurality of object detections in the second frame;
for each of the plurality of areas in the second frame, determining, by the trained convolutional neural network, a set of feature vectors associated with that area in the second frame comprising two or more feature vectors, thereby determining a plurality of candidate sets of feature vectors, each candidate set of feature vectors comprising two or more feature vectors;
for each feature vector of the reference set of feature vectors, identifying, among the feature vectors of the plurality of candidate sets of feature vectors, a predetermined number of feature vectors having smallest distances in the feature vector space to that feature vector of the reference set of feature vectors, thereby identifying a set of closest feature vectors;
for each candidate set of feature vectors of the plurality of candidate sets of feature vectors, determining a measure of closeness to the reference set of feature vectors as a proportion of the set of closest feature vectors that belong to that candidate set of feature vectors, wherein the predetermined number is set such that the influence of outliers of the reference set and the candidate sets on the measure of closeness is reduced, wherein the outliers of the reference set and the candidate sets are feature vectors that are located at above a threshold distance in the feature vector space away from the other feature vectors of the same of the reference set and the candidate sets, respectively;
for each of the plurality of object detections in the second frame, assigning a weight based on the determined measure of closeness to the reference set of feature vectors of the candidate set of feature vectors corresponding to that object detection; and
associating the object detection in the first frame with one object detection of the plurality of object detections in the second frame based on the assigned weights.

12. A device for associating an object detection in a first frame with an object detection in a second frame using a convolutional neural network trained to determine feature vectors such that feature vectors of object detections relating to separate objects are arranged in separate clusters in a feature vector space, comprising circuitry connected to storage device configured to:
receive an area of the first frame corresponding to the object detection in the first frame;
determine, by the trained convolutional neural network, a set of feature vectors associated with the area in the first frame comprising two or more feature vectors, thereby determining a reference set of feature vectors associated with the object detection in the first frame comprising two or more feature vectors;
receive a plurality of areas of the second frame corresponding to respective ones of a plurality of object detections in the second frame;
for each of the plurality of areas in the second frame, determine, by the trained convolutional neural network, a set of feature vectors associated with that area in the second frame comprising two or more feature vectors, thereby determining a plurality of candidate sets of feature vectors, each candidate set of feature vectors comprising two or more feature vectors;
for each feature vector of the reference set of feature vectors, identify, among the feature vectors of the plurality of candidate sets of feature vectors, a predetermined number of feature vectors having smallest distances in the feature vector space to that feature vector of the reference set of feature vectors, thereby identifying a set of closest feature vectors;
for each candidate set of feature vectors of the plurality of candidate sets of feature vectors, determine a measure of closeness to the reference set of feature vectors as a proportion of the set of closest feature vectors that belonging to that candidate set of feature vectors, wherein the predetermined number is set such that the influence of outliers of the reference set and the candidate sets on the measure of closeness is reduced, wherein the outliers of the reference set and the candidate sets are feature vectors that are located at above a threshold distance in the feature vector space away from the other feature vectors of the same of the reference set and the candidate sets, respectively;

for each of the plurality of object detections in the second frame, assign a weight based on the determined measure of closeness to the reference set of feature vectors of the candidate set of feature vectors corresponding to that object detection; and associate the object detection in the first frame with one object detection of the plurality of object detections in the second frame based on the assigned weights.

13. The device of claim 12, wherein:

for any two object detections of the plurality of object detections in the second frame having the same measure of closeness, the assigned weight is the same for the two object detections; and for any object detection of the plurality of object detections in the second frame having a higher measure of closeness than another object detection of the plurality of object detections in the second frame, the assigned weight is higher for said any object detection than the assigned weight for said another object detection.

14. The device of claim 12, wherein the circuitry is further configured to, for each object detection of the plurality of object detections in the second frame, calculate, based on the weight for that object detection, an association score indicating a probability that that object detection in the second frame is associated with the object detection in the first frame.

15. The device of claim 14, wherein the association score is further based on a predicted state in the second frame of the object detection in the first frame.

* * * * *